United States Patent [19]
Chambers et al.

[11] 3,971,978
[45] July 27, 1976

[54] GENERATOR CONTROL SYSTEM

[75] Inventors: George S. Chambers, Waynesboro; Lawrence J. Lane, Stuarts Draft, both of Va.

[73] Assignee: General Electric Company, Salem, Va.

[22] Filed: Aug. 26, 1975

[21] Appl. No.: 607,784

[52] U.S. Cl. .................................. 322/68; 322/25
[51] Int. Cl.² .......................................... H02P 9/14
[58] Field of Search .......................... 322/25, 28, 68

[56] References Cited
UNITED STATES PATENTS

| | | | |
|---|---|---|---|
| 3,369,171 | 2/1968 | Lane | 322/68 |
| 3,548,287 | 12/1970 | Blaschke et al. | 322/25 X |

Primary Examiner—J. D. Miller
Assistant Examiner—Robert J. Hickey
Attorney, Agent, or Firm—Arnold E. Renner; Philip L. Schlamp

[57] ABSTRACT

A generating system employing a generator having a self-excited field winding the excitation of which is achieved by supplying a bridge circuit with signals which are, respectively, proportional to the generator terminal voltage and the load current further includes means to selectively short-circuit the field winding during each cycle of normal generator operation. The system further includes a feedback path or loop for controlling the time during which the field winding is short-circuited which feedback path develops a control signal by comparing a signal representing the voltage supplied to the bridge circuit with a reference signal to develop an error signal which is then modified by a further signal proportional to the Thevenin equivalent voltage of the bridge circuit to thus linearize the feedback loop.

8 Claims, 5 Drawing Figures

GENERATOR CONTROL SYSTEM

BACKGROUND OF THE INVENTION

The present invention relates generally to the control of dynamoelectric machines and more particularly to a generator system of the type employing a self-excited field winding to which power may be selectively applied to achieve stable and accurate control of the generator output.

It is a common objective in the art to provide a generator system which includes means for insuring startup of the generator from a zero condition to a rated condition using only the residual magnetism of the field and to use the same control system on a wide variety of generators. One such known system employs a self-excited generator field winding which receives excitation power from the generator output and which field winding may be selectively short-circuited for a variable period of time during each cycle of normal generator operation such that the time period of short-circuiting of the field winding controls the excitation and hence the generator operation. An example of such a system may be found in U.S. Pat. No. 3,369,171, "Control Circuits", by Lawrence J. Lane, issued Feb. 13, 1968, and assigned to the assignee of the present invention. Control circuits such as that described in the aforementioned patent, and modifications thereof, employ a feedback path which is responsive to an operating parameter; e.g., the voltage of a bridge circuit which supplies power to the field, to develop a control signal utilized to vary the time during which the field winding is short-circuited. While these systems operate satisfactorily for the most part and are a vast improvement in economy and performance over still older systems employing an entirely separate and distinct means for supply excitation to the field winding, it is quite often the case that the feedback is nonlinear such that the overall control of the generator system is not as accurate as is desirable in some instances.

SUMMARY OF THE INVENTION

It is, therefore, an object of the present invention to provide an improved power generation system.

It is a further object to provide an improved generator control system of the type employing a self-excited field winding.

It is another object to provide an improved linearized control system for self-excited generator field winding.

It is a still further object to provide a control system for a generator having a self-excited field winding in which the field winding may be selectively short-circuited and which provides for a linearized feedback path to control the short-circuiting of the field winding.

It is a still further object to provide a linearized feedback loop for the control of the excitation of a self-excited field winding of a power generator.

The foregoing and other objects, which will become clear as this description proceeds, are achieved in accordance with the present invention by providing a generator system of the type in which a self-excited generator field winding is powered by way of a rectifier bridge circuit which in turn is sourced by signals proportional in magnitude to the generator terminal voltage and the current supplied by the generator to a load. The system further includes a suitable control means to selectively short-circuit the field winding to control the excitation of the generator and a feedback loop is provided for controlling the short-circuiting means. The feedback loop is responsive to a variable parameter of the system, for example, a voltage across the bridge circuit supplying the field winding, to develop a signal proportional thereto which is then compared with a suitable reference to develop an error signal. Because there is an inherent multiplication involved in this type of circuit, the feedback loop is linearized by further modifying the error signal by a signal which represents the Thevenin equivalent voltage effecting the original feedback signal to thus linearize the system and provide the final control signal for determining when the short-circuiting means is operative.

BRIEF DESCRIPTION OF THE DRAWING

The novel features of the invention are set forth with particularly in the claims annexed to and forming part of this specification. The invention itself, however, both as to its organization and operation may be best understood by reference to the following description taken in conjunction with the accompanying drawing in which:

DETAILED DESCRIPTION

Figure 1:
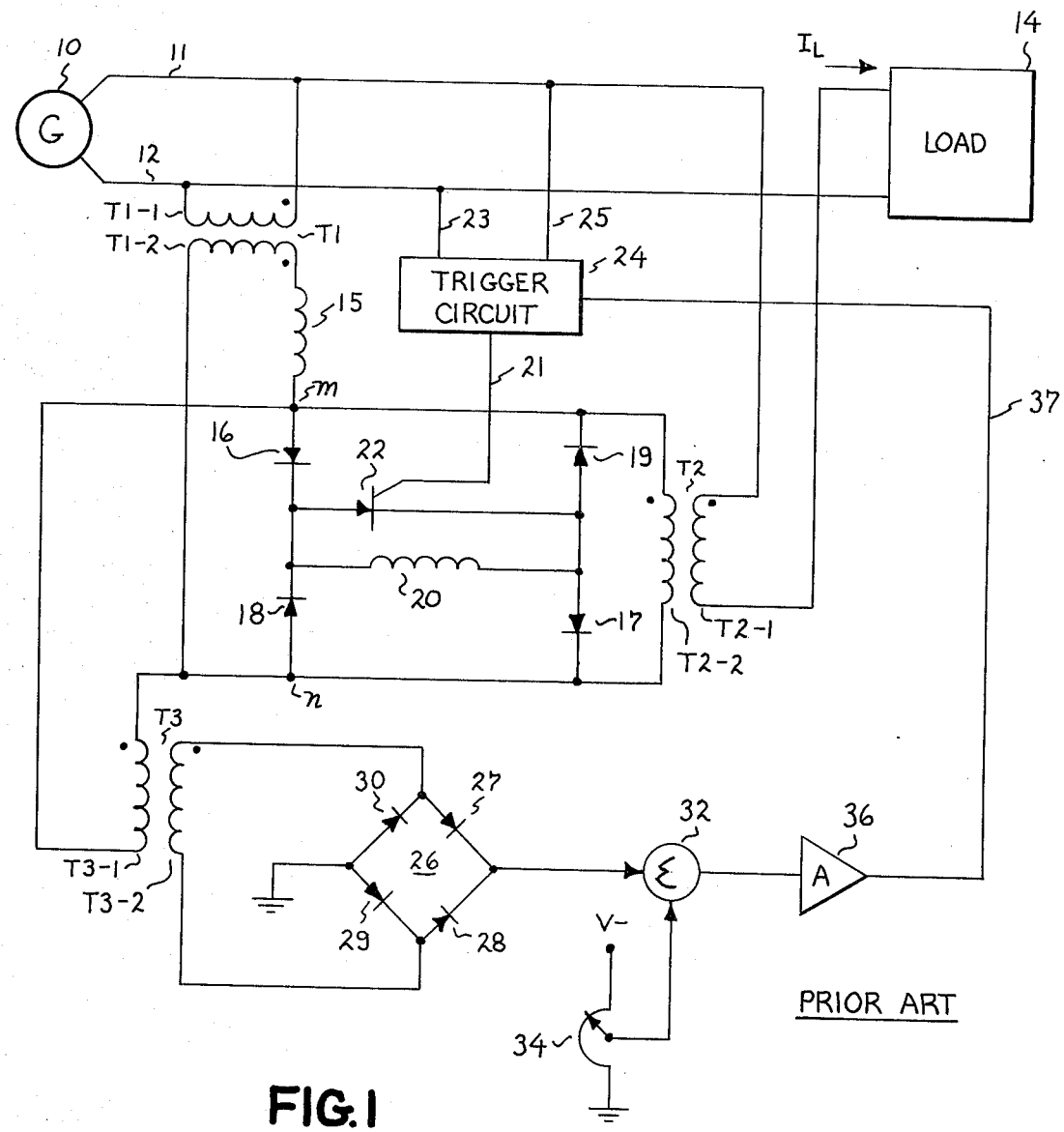
FIG. 1 is a circuit schematic showing a generator system of the prior art to which the present invention is applicable.

Referencing now FIG. 1, there is shown in single phase form, a generator control system of the prior art. Those familiar with the art will recognize FIG. 1 to be essentially that system described and claimed in the afore-mentioned U.S. Pat. No. 3,369,171 which patent is expressly incorporated hereinto by reference and is relied upon for a more complete description and understanding of the invention as employed in the total system. The depiction of FIG. 1, as will be recognized by those skilled in the art, differs from that shown in the U.S. Pat. No. 3,369,171 by what is now also a well-known feedback loop. This loop, as will be more fully understood as this description proceeds, utilizes a voltage proportional to the voltage across the generator field to thereby regulate the field voltage. In the previously mentioned patent the parameter regulated was the generator terminal voltage. Both systems are, however, well known in the art.

While the aforementioned U.S. Pat. No. 3,369,171 is relied upon for a complete understanding of the FIG. 1 showing, a brief description of that figure is as follows. A generator 10 supplies power over lines 11 and 12 to a load 14. The terminal voltage of the generator 10, that is the voltage across lines 11 and 12, is applied to a transformer T1 having a primary T1-1 and a secondary T1-2. The voltage across the secondary winding T1-2 is applied by way of a linear reactor 15 to two input terminals *m* and *n* of a full wave rectification bridge comprises of four diodes 16, 17, 18 and 19. This bridge is referred to as the exciter bridge and serves to supply power to a generator field winding 20 connected between the remaining two terminals of the bridge. The exciter bridge (diodes 16–19) also receives power from a second source comprised of a current transformer T2 having its primary winding T2-1 shown connected in the generator output line 11 such that the current flowing through this primary winding is the load current $I_L$. The secondary winding of transformer T2, winding T2-2, is also connected across the bridge terminals m and n such that the power supplied to the winding 20 is a function of both the generator terminal voltage and the load current. The reactor 15 permits the excitation of the bridge, and hence the field winding, from the voltage and current sources and further allows the exciter to be matched to the generator all as is more fully explained in the aforementioned U.S. Pat. No. 3,369,171.

A controlled rectifier 22 which would normally be a thyristor of the type more commonly known as a silicon controlled rectifier (SCR) is connected in parallel with the field winding 20 such that when rectifier 22 is conducting the winding is short-circuited. The conduction time of the thyristor 22 is initiated by gate or control pulses applied to the gating electrode of the thyristor by way of a line 21. The gate or control pulses are supplied by a trigger circuit 24. Trigger circuit 24 may be any of those circuits well known in the art which serves to supply pulses in what is commonly known as a phase controlled mode. To this end, trigger circuit 24 receives a synchronizing reference signal from lines 11 and 12 by way of lines 25 and 23, respectively. The time at which a gate or control pulse will be generated for application via line 21 to the thyristor 22 is a function of the magnitude of the signal appearing on a line 37 applied to the trigger circuit 24.

The generation of the control signal on line 37 is achieved in the prior art circuit of FIG. 1 by a feedback path which looks at the voltage at the terminals m and n of the bridge circuit (diodes 16–19). This voltage is proportional to the voltage across the field 20. The signal from terminals m and n, a voltage signal, is applied to a transformer T3 having a primary winding T3-1 and a secondary winding T3-2. The secondary winding T3-2 is connected across the terminals of a full wave rectification bridge indicated generally at 26 having diodes 27, 28, 29 and 30. The output of the bridge 26, an analog signal proportional to the a.c. voltage at terminals m and n, and hence proportional to the voltage across the field 20, serves as one input to a summing junction 32. Junction 32 also has, as a second input, a reference signal which is proportional to the desired field excitation. For the sake of simplicity, this reference signal is shown as a voltage signal obtained from a reference potentiometer 34 connected between a source of negative voltage V− and ground. It is, of course, to be expressly understood that this derivation of the reference signal is merely illustrative and that any appropriate means, manual or otherwise, may be employed.

The output of the summing junction 32 represents the algebraic sum (i.e., the difference between the magnitudes) of its two inputs, is referred to as an error signal and represents the difference between the actual degree of excitation field and that desired. This error signal is scaled by means of a suitable amplifier 36 the output of which is an analog voltage signal which appears on line 37. The magnitude of the signal on line 37 controls the trigger circuit 24 to thus determine the time of production of the control pulses applied via line 21 to thyristor 22 and hence control the excitation of the field winding 20 by governing the amount of time that the field winding is short-circuited.

In summary, the prior art system illustrated in FIG. 1 compares the voltage at the bridge terminals m and n, which is proportional to the field voltage, to a predetermined reference signal and from that comparison develops an error signal which controls the firing of the thyristor 22 and hence the degree of excitation of the field 20 to regulate the generator operation.

The system illustrated in FIG. 1, to which the present invention is an improvement, lacks the accuracy desired in certain instances because the control of the trigger circuit 24 and hence the thyristor 22 by means of the signal on line 37 is not linear. That is, the entire feedback loop including the bridge and the power sources supplying the bridge act as a multiplier such that even if the terminal voltage of the generator 10 were held constant (i.e., the voltage across winding T1-2 held constant), if the system required more power thus increasing the load current, there was a multiplication factor in the feedback. The same is true if the load current $I_L$ is held constant and the terminal voltage changed or if both the terminal voltage and the load current change. This nonlinearity may be best understood with reference to FIG. 2 and its associated vector diagram FIG. 3.

Figure 2:
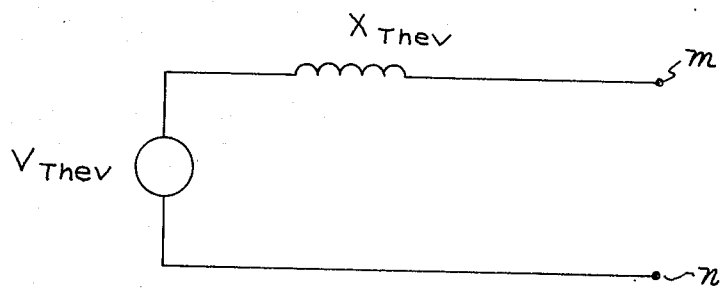
FIG. 2 is a schematic drawing illustrating the Thevenin equivalent circuit as seen by the feedback path in FIG. 1.

FIG. 2 illustrates the Thevenin equivalent circuit, looking back from terminals m and n, into the power sources for the bridge circuit for the field winding 20. The *Radio Engineer's Handbook* by F. E. Terman (McGraw Hill Book Company, Inc., Copyright 1943) states Thevenin's theorem as:

Any linear network containing one or more sources of voltage and having two terminals behaves, insofar as a load impedance connected across the terminals is concerned, as though the network and its generator were equivalent to a simple generator having an internal impedance Z and a generated voltage E, where E is the voltage that appears across the terminals when no load impedance is connected and Z is the impedance that is measured between the terminals when all sources of voltage in the network are short-cicuited.

Applying Thevenin's theorem, the circuitry seen by the primary winding T3-1 at terminals m and n of FIG. 1 may be reduced to that shown in FIG. 2. Specifically, this circuitry consists of a voltage source indicated as $V_{Thev}$ and a series impedance shown as a reactor $X_{Thev}$. If one now writes the equation for the circuitry of FIG. 2, utilizing the voltage and current sources of FIG. 1, it may be shown that:

$$V_{Thev} = V_{T1\text{-}2} + jX_{15}I_{T2\text{-}2}$$

wherein, $V_{T1\text{-}2}$ = voltage across winding T1-2
$X_{15}$ = impedance of reactor 15
$I_{T2\text{-}2}$ = current in winding T2-2.

Figure 3:
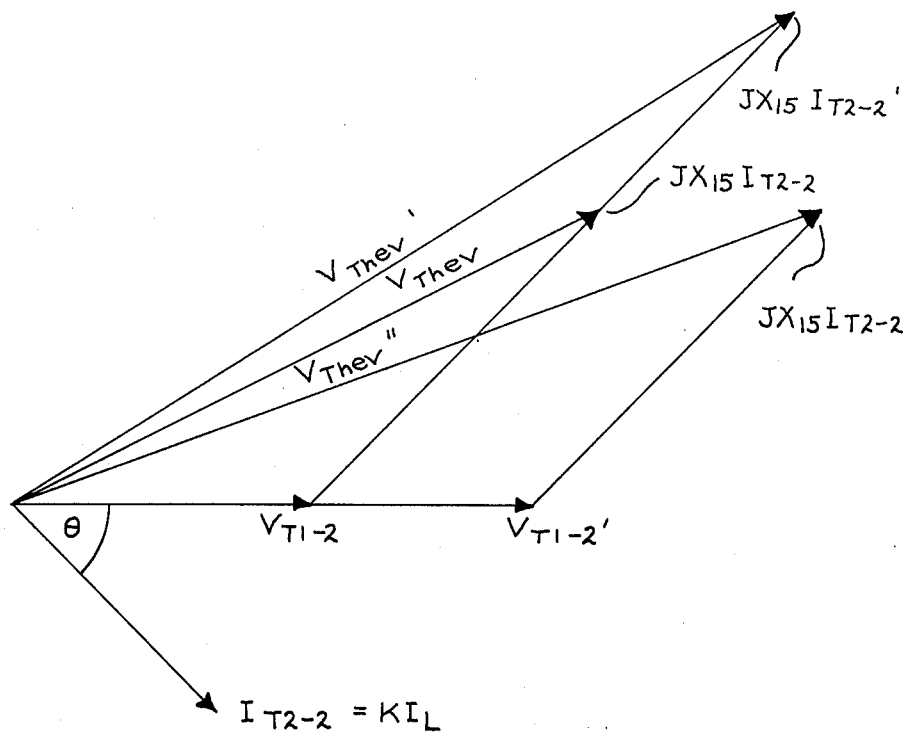
FIG. 3 is a vector diagram illustrating the problems occasioned by the nonlinearity of the prior art control; and, FIG. 4 is a schematic drawing illustrating the improved feedback path of the present invention which may be substituted for the feedback control in the overall system of FIG. 1.

FIG. 3 illustrates three Thevenin equivalent voltages labeled, respectively, ($V_{Thev}$), ($V_{Thev}'$) and ($V_{Thev}''$). As illustrated, the current in winding T2-2 ($I_{T2\text{-}2}$) is proportional by some factor K to the load current $I_L$ and lags the voltage of winding T1-2 by an angle $\theta$. From FIG. 3 it is readily seen that when either the voltage $V_{T1\text{-}2}$ or the current $I_L$, and hence the secondary current of transformer T2 varies, the Thevenin equivalent voltage seen by the feedback loop in FIG. 1 will vary in the same proportion and hence is nonlinear.

Figure 4:
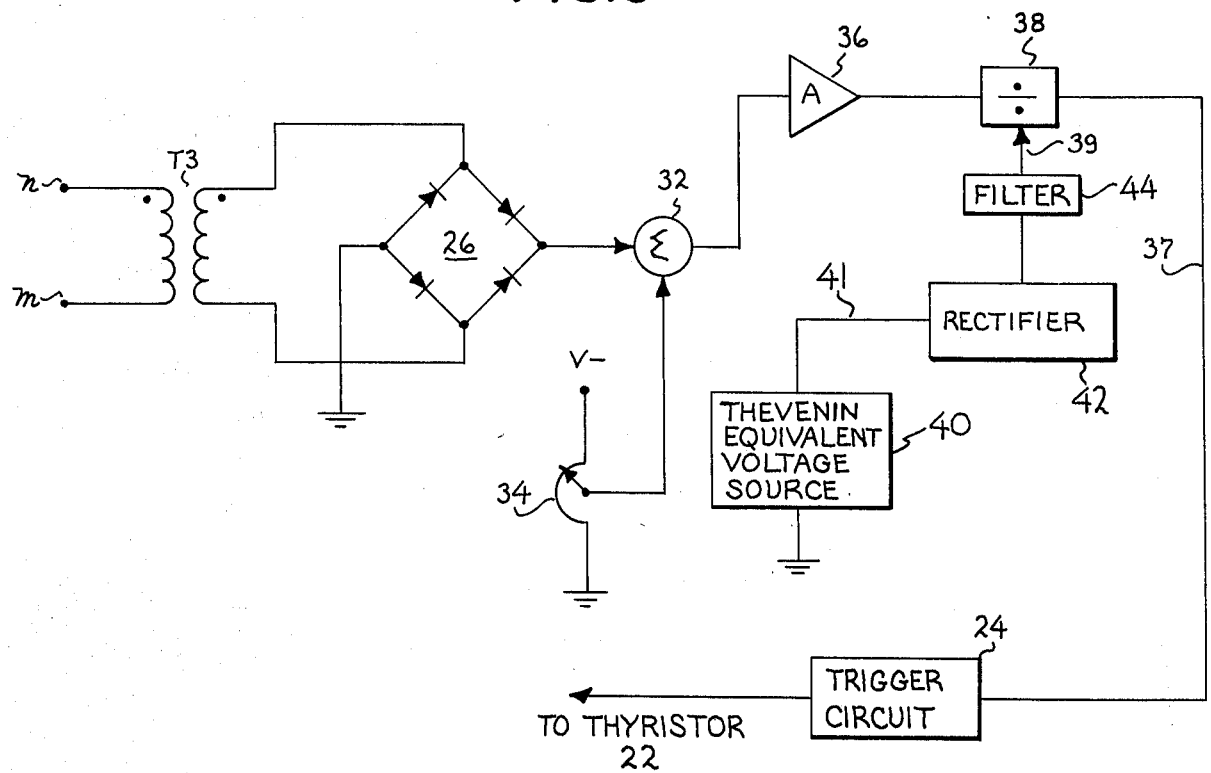

To linearize the feedback loop the present invention incorporates a modification to the feedback loop as illustrated in FIG. 4. This circuit, when substituted for the corresponding portions of the system depicted in FIG. 1 provides the linearized controlled system of the present invention. As was the case in FIG. 1, the signal, a voltage signal, appearing at terminals m an n is applied to the primary winding T3-1 of transformer T3. The secondary winding T3-2 of transformer T3 is connected to bridge 26 and the d.c. output of the bridge is applied to summing junction 32. As before, the second input to the summing junction 32 is derived from a suitable reference source again shown as a potentiometer 34 connected between a source of negative voltage and ground. The output of junction 32, an error signal representing the difference between that desired and that actually being achieved, is applied to the amplifier 36 for scaling purposes all in a manner as was previously described with respect to FIG. 1. In accordance with the invention, however, the output of amplifier 36 rather than being applied directly to the trigger circuit 24 serves as one input to a dividing circuit (divider) 38. Divider 38 may be any appropriate divider circuit of a type well known in the art. In the actual implementation of the preferred embodiment, the divider used was a Model 432J divider supplied by Analog Devices, Inc. of Norwood, Mass. Another example of a suitable dividing network for incorporation in the present invention may be found in Section 7.5.7 (page 279) of *Operational Amplifiers* published by McGraw Hill Book Company, Inc., Copyrighted 1971 by Burr-Brown Research Corporation (Library of Congress Catalog Card No. 74-163297).

The input from the amplifier 36 to the divider 38 forms the dividend of the operation performed by the circuit 38 with a divisor being supplied on a second input (line 39). The signal on line 39 is provided by associated circuitry which includes a Thevenin equivalent voltage source 40 which outputs a signal proportional to the Thevenin equivalent voltage of the circuit as seen looking back from terminals m and n in FIG. 1. This source may be of any suitable type but is, preferably, that shown by and described with respect to FIG. 5 of this specification. The output of the source 40, an a.c. signal, is applied (line 41) to a full wave rectifier as illustrated by block 42. Rectifier 42 may be of any suitable type, e.g., an operational amplifier precision rectifier, and provides an output which is a d.c. level proportional to the a.c. output from the source 40. The output of the rectifier 42 is, preferably, filtered by a suitable low pass filter 44 the output of which then forms the input on line 39, that is, the divisor to the divider circuit 38. (If desired, a suitable scaling amplifier, not shown, may be placed between filter 44 and the divider 38.)

It will be remembered from the earlier description, particularly that of FIGS. 2 and 3, that the basic prior art circuit resulted in a multiplication proportional to the Thevenin equivalent voltage. Thus, by dividing the analog signal from the amplifier 36 by a factor which is proportional to the Thevenin equivalent voltage as seen at terminals m and n in FIG. 1 the output is linearized. This linearized signal is then applied to the trigger circuit 24 (through a suitable scaling amplifier if desired — not shown) to thus effect a more accurate and linear control of the firing of the thyristor 22 to provide a more accurate overall control of the generator system.

Figure 5:
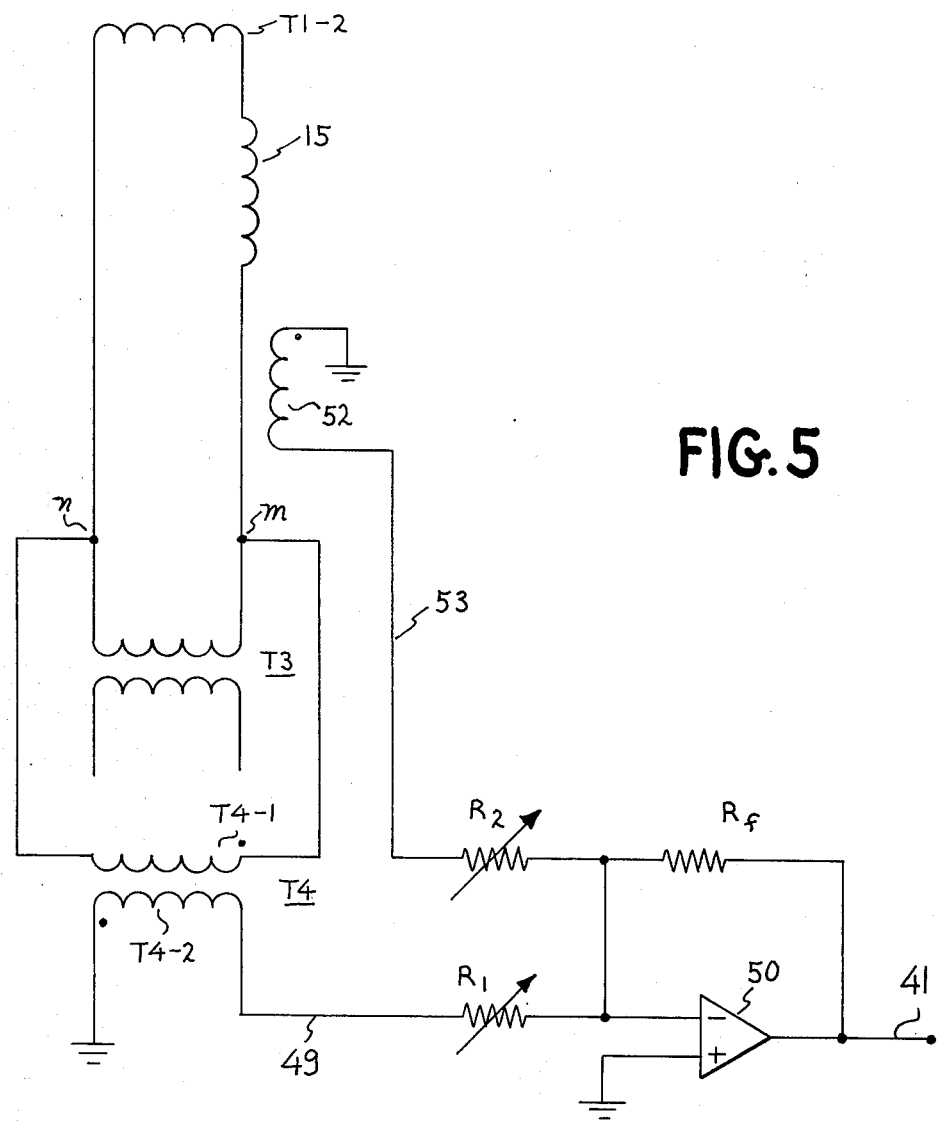
FIG. 5 is a schematic drawing showing in detail the preferred implementation of the equivalent voltage source shown in block form in FIG. 4.

FIG. 5 illustrates the preferred means for developing the Thevenin equivalent voltage for utilization in the system of the present invention. This means was generally shown as block 40 in FIG. 4. The circuit of FIG. 5 to develop the Thevenin equivalent voltage is included within the subject matter of co-pending application Ser. No. 607,785, "Voltage Synthesization" by Lawrence J. Lane, which application is assigned to the assignee of the present invention, was filed on even date herewith and which co-pending application is specifically incorporated hereinto by reference.

While the aforementioned application Ser. No. 607,785 is relied upon for a more complete understanding of the circuitry of FIG. 5, a brief description is as follows. Included in the FIG. 5 showing is that portion of the FIG. 1 depiction deemed necessary for proper orientation of the circuitry. FIG. 5 shows the transformer secondary winding T1-2 connected, via the reactor 15, to terminals m and n to which is also connected the primary winding of transformer T3. A third transformer T4 also has its primary winding T4-1 connected to the terminals $m$ and $n$. The secondary winding of transformer T4, winding T4-2, has one end connected to ground and its free end connected via a conductor 49 to a resistor $R_1$ the free end of which is connected to the inverting input of an operational amplifier 50. The noninverting input to amplifier 50 is connected to ground and a feedback resistor $R_f$ is located between the inverting input and the output of the amplifier. The signal supplied to amplifier 50 by way of transformer T4 and resistor $R_1$ will be proportional to the voltage at terminals $m$ and $n$ ($v_{mn}$).

An induction coil 52 is inductively coupled to the conductor connecting the secondary winding T1-2 to terminal m by way of reactor 15. This coil is preferably a toroid wound on a nonmagnetic, nonconducting core; e.g., an air core or a ceramic core, so that the voltage induced into that coil is an accurate portrayal or representation of the change in the current $i$ in the conductor with respect to time; i.e. $di/dt$. Coil 52 has one end thereof connected to ground and the free end connected via a line 53 to a resistor $R_2$. The other end of resistor $R_2$ is also connected to the inverting input of amplifier 50.

Amplifier 50 provides, as its output, a signal which is a function of the two signals applied to its input by way of the input resistors $R_1$ and $R_2$. The output of amplifier 50 is the simulation of the Thevenin equivalent voltage as seen at terminals $m$ and $n$ and it is this output, appearing on line 41, that forms the input to the rectifier 42 as shown in FIG. 4.

While, as previously stated, the aforementioned co-pending patent application, Ser. No. 607,785, is relied upon for a fuller understanding of the circuit of FIG. 5, the operation of that circuit is essentially as follows. Looking first at the voltage signal derived from coil 52, the instantaneous voltage ($v_{53}$), with respect to ground, on line 53 is defined by the equation:

$$v_{53} = -M(di/dt) \qquad (1)$$

wherein $M$ equals the mutual inductance of coil 52 and its associated conductor.

The signal appearing on line 49 ($v_{49}$), again with respect to ground, is expressed by the formula:

$$v_{49} = -v_{mn}(N_2/N_1) \quad (2)$$

wherein $v_{mn}$ is the instantaneous voltage across terminals $m$ and $n$ and $N_2/N_1$ is the turns ratio of the transformer T4.

Because reactor 15 and the coil 52 are defined for any given circuit, M is proportional to the inductance L of reactor 15 by a constant factor $a_m$, or:

$$M = a_m L \quad (3)$$

Conventional operational amplifier application teaches that the gain of such an amplifier stage is proportional to the ratio of its feedback resistor to its input resistor. Further, an operational amplifier stage introduces a signal inversion so that, using the resistor designation characters for the respective resistance values;

$$v_{41} = -\left(\frac{R_f}{R_1} v_{49} + \frac{R_f}{R_2} v_{53}\right) \quad (4)$$

wherein $v_{41}$ is the output of amplifier 50.

Substituting from equations (1) and (2) into equation (4) gives:

$$v_{41} = \frac{R_f}{R_1} \cdot \frac{N_2}{N_1} v_{mn} + \frac{R_f}{R_2} \cdot M \frac{di}{dt} \quad (5)$$

As is fully explained in the aforementioned copending application Ser. No. 607,785, the instantaneous Thevenin equivalent voltage ($v_{Thev}$) as seen at terminals $m$ and $n$ is:

$$v_{Thev} = v_{mn} + L(di/dt)$$

Realizing that in equation (5) that the terms $N_2/N_1$ and $M$ are constants and that, from equation (3), $M$ is proportional to $L$, the similarities between equations (5) and (6) become immediately obvious and it can be accurately stated that the term $v_{41}$ is proportional to the Thevenin equivalent voltage, $v_{Thev}$, by some factor, as yet undetermined. Stated mathematically;

$$v_{41} = v_{Thev}/a_T \quad (7)$$

wherein $a_T$ is a constant.

Combining equations (6) and (7) gives:

$$v_{41} = \frac{v_{Thev}}{a_T} = \frac{R_f}{R_1} \cdot \frac{N_2}{N_1} v_{mn} + \frac{R_f}{R_2} \cdot M \frac{di}{dt} \quad (8)$$

or, $$v_{Thev} = a_T v_{41} = a_T \frac{R_f}{R_1} \cdot \frac{N_2}{N_1} v_{mn} + a_T \frac{R_f}{R_2} \cdot M \frac{di}{dt} \quad (9)$$

If now $a_T(R_f/R_1)(N_2/N_1)$ were set equal to 1 and $a_T(R_f/R_2)(M)$ were set equal to L, then equation (9) would be reduced to $$v_{Thev} = v_{mn} + L(di/dt) = v_{41} a_T \quad (10)$$

The reduction of equation (9) to that shown in (10) and the making of the voltage $v_{41}$ equal to $v_{Thev}$ is achieved, in the circuit of FIG. 5, by the proper adjustment of the resistors $R_f$, $R_1$ and $R_2$. The adjustment of these resistors is also fully explained in detail in the co-pending application Ser. No. 607,785. Briefly, however, the values of these resistors can be mathematically determined by first determining the constant $a_T$ from the relationship of equation (7). This is done by disconnecting the load (i.e., diodes 16 through 19, thyristor 22 and field winding 20) and measuring the voltage at terminals $m$ and $n$ and the voltage on line 41. Because no load current is now flowing, $v_{mn}$ will be equal to the Thevenin equivalent voltage. Thus, equation (7) may now be solved for $a_T$ using the voltages just measured. Knowing $a_T$, the relationship $a_T(R_f/R_1)(N_2/N_1)=1$ may be solved for the ratio of $R_f/R_1$ ($N_2/N_1$ is known from the transformer design) and equation (9) may then be solved for the ratio $R_f/R_2$ by measuring the $di/dt$ with the load reconnected ($M$ is a known or measurable constant).

A second method for adjusting resistors $R_f$, $R_1$ and $R_2$ often used with accurate results, is to record, e.g., by an oscilloscope, the wave shape of the signal on line 41 with the load disconnected and then reconnecting the load and adjusting these resistors to duplicate the wave shape.

With the application of the Thevenin equivalent voltage signal to the divider 38 (FIG. 4) the feedback circuit is linearized and a generating system of improved performance is achieved.

While there has been shown and described what is at present considered to be the preferred embodiment of the invention, modifications thereto will readily occur to those skilled in the art. For example, while for the sake of simplicity the system is shown in the single phase embodiment, it would have equal application to a multi-phase system. For example, to employ the present invention in a three phase system would require only, first, the generation of the synthesized or simulated Thevenin equivalent voltage for each of the three phases. Each of these three voltages could then be rectified and the rectified equivalents combined by, for example, a three input operational amplifier to provide an average output signal which is applied to the divider circuit of the invention. It is not desired, therefore, that the invention be limited to the specific embodiment shown and described and it is intended to cover in the appended claims all such modifications as fall within the true spirit and scope of the invention.

What is claimed is:

1. In a generator field excitation system of the type in which the generator output is utilized to provide an excitation current to the generator field winding through an exciter circuit and which further includes means responsive to control pulses to selectively short-circuit the field winding during a portion of each cycle of normal generator operation, means to develop said control pulses comprising:
 a. circuit means for providing said control pulses in response to a variable input signal;
 b. means to provide a reference signal of desired magnitude;
 c. means to provide an additional signal proportional to the amount of field excitation;
 d. means to compare said reference signal and said additional signal to provide an error signal proportional to the algebraic sum thereof:
 e. means to provide a correction signal proportional to the Thevenin equivalent voltage of the exciter circuit; and,
 f. means to divide said error signal by said correction signal to provide said variable input signal.

2. The invention in accordance with claim 1 wherein said reference, additional, error, correction and input signals are each voltage signals.

3. A generator field excitation system of the type in which a generator having an excitable field winding supplies current to a load comprising:
 a. a field excitation circuit for exciting said field winding in response to first and second signals including,
  1. means to develop said first signal as a function of the magnitude of the generator output voltage,
  2. means to develop said second signal as a function of the magnitude of the current supplied to the load, and
  3. means to selectively short-circuit said field winding selectively during a portion of each cycle of normal generator operation in response to control pulses delivered thereto; and,
 b. means to develop said control pulses including,
  1. circuit means for providing said control pulses in response to a variable input signal,
  2. means to provide a reference signal of desired magnitude,
  3. means to provide an additional signal proportional to the amount of field excitation,
  4. means to compare said reference signal and said additional signal to provide an error signal proportional to the algebraic sum thereof,
  5. means to provide a correction signal proportional to the Thevenin equivalent voltage of the field exciter circuit, and
  6. means to divide said error signal by said correction signal to provide said variable input signal.

4. The invention in accordance with claim 3 wherein said field excitation circuit includes a full wave rectifier bridge.

5. The invention in accordance with claim 3 wherein all signals are voltage signals.

6. The invention in accordance with claim 4 wherein the Thevenin equivalent voltage used is that across the rectifier bridge.

7. A power generation system for supplying power to a load comprising:
 a. a generator having output terminals and a self-excited field winding;
 b. circuit means for supplying excitation power to said field winding, said circuit means including,
  1. a rectifier bridge circuit for supplying d.c. power to said field winding,
  2. first means for supplying power to said bridge in proportion to the terminal voltage of said generator,
  3. second means for supplying power to said bridge in proportion to the current supplied to the load from said generator,
  4. control means responsive to control pulses to selectively short-circuit said field winding during a portion of each cycle of normal generator operation, and
  5. means to generate said control pulses including,
   i. means to provide a feedback signal proportional to the bridge circuit voltage,
   ii. means to provide a reference signal of desired magnitude,
   iii. means to compare the feedback signal and the reference signal to develop an error signal,
   iv. means to provide a signal proportional to the Thevenin equivalent voltage of said bridge circuit, and
   v. means to divide said error signal by the signal proportional to the Thevenin equivalent voltage to provide a control signal for governing the generation of said control pulses.

8. The invention in accordance with claim 7 wherein the first feedback signal is proportional to the vector sum of the generator terminal voltage and the load current.

* * * * *